United States Patent [19]
Lyons et al.

[11] Patent Number: 5,578,880
[45] Date of Patent: Nov. 26, 1996

[54] FAULT TOLERANT ACTIVE MAGNETIC BEARING ELECTRIC SYSTEM

[75] Inventors: James P. Lyons; Mark A. Preston, both of Niskayuna, N.Y.

[73] Assignee: General Electric Company, Schenectady, N.Y.

[21] Appl. No.: 276,586

[22] Filed: Jul. 18, 1994

[51] Int. Cl.$^6$ ....................................... H02K 7/09
[52] U.S. Cl. ............................................. 310/90.5
[58] Field of Search ................ 310/90.5; 318/564, 318/565

[56] References Cited

U.S. PATENT DOCUMENTS

| | | | |
|---|---|---|---|
| 4,245,869 | 1/1981 | Scheffer | 310/90.5 |
| 4,866,318 | 9/1989 | Habermann et al. | 310/90.5 |
| 4,896,088 | 1/1990 | Jahns | 318/696 |
| 4,896,089 | 1/1990 | Kliman et al. | 318/701 |
| 4,999,534 | 3/1991 | Andrianos | 310/90.5 |
| 5,027,280 | 6/1991 | Ando et al. | 310/90.5 |
| 5,095,237 | 3/1992 | Bardas et al. | 310/90.5 |
| 5,220,222 | 6/1993 | Shtipelman | 310/90.5 |
| 5,300,843 | 4/1994 | Lyons et al. | 310/90.5 |
| 5,347,190 | 9/1994 | Lewis et al. | 310/90.5 |
| 5,355,042 | 10/1994 | Lewis et al. | 310/90.5 |
| 5,424,595 | 6/1995 | Preston et al. | 310/90.5 |

OTHER PUBLICATIONS

MacMinn et al., "A Very High Speed Switched–Reluctance Starter–Generator for Aircraft Engine Applications", 1989 NAECON, May 1989, pp. 1758–1764.

Richter, "Switched Reluctance Machines for High Performance Operations in a Harsh Environment", Proc. of the 1990 Int'l Conf. on Electrical Machines, vol. 1, Aug. 1990, pp. 18–24.

Stephens, "Fault Detection and Management System for Fault Tolerant Switched Reluctance Motor Drives", Conf. Rec. of the 1989 IEEE Industry Appl. Soc. Annual Meeting, Oct. 1989, pp. 574–578.

Richter, "High Temperature, Lightweight, Switched Reluctance Motors and Generators for Future Aircraft Engine Applications", Proc. of 1989 American Control Conference, Jun. 1988, pp. 1846–1851.

Yates et al., "A Fault–Tolerant Multiprocessor Controller for Magnetic Bearings", IEEE Micro, Aug. 1988, pp. 6–17.

Gondhalekar et al., "Design of a Radial Electromagnetic Bearing for the Vibration Control of a Supercritical Shaft", Proc. of the Institute of Mechanical Engineers, vol. 198C, No. 16, 1984, pp. 235–242.

*Primary Examiner*—Clayton E. LaBalle
*Attorney, Agent, or Firm*—Marvin Snyder

[57] ABSTRACT

A fault tolerant active magnetic bearing system comprises a magnetic bearing having a rotor mounted for rotation within a stator and for coupling to a shaft. An electric power distribution system is energized from a multi-phase switched reluctance machine supplying three independent DC power buses. Each of the power buses is coupled for supplying power to a respective pair of diametrically opposite electromagnets of the magnetic bearing so as to establish multiple magnetic control axes. Multiple power controllers are each operatively connected in circuit with a separate respective power bus. The power controllers include independent power control systems each coupled to a respective pair of diametrically opposite electromagnets for independently controlling energization of each one of the pair of diametrically opposite electromagnets.

8 Claims, 5 Drawing Sheets

BEARING AXES

FAULT TOLERANT ACTIVE MAGNETIC BEARING ELECTRIC SYSTEM

RELATED PATENT APPLICATION

This application is related to our commonly assigned U.S. patent application, Ser. No. 08/276,585 filed concurrently herewith, now abandoned in favor of continuation application Ser. No. 08/567,500, filed Dec. 5, 1995 and hereby incorporated by reference.

BACKGROUND OF THE INVENTION

The present invention relates generally to fault tolerant electric power systems and, more particularly, to a fault tolerant electric power system for an active magnetic bearing having at least three axes of control and being capable of maintaining rotor shaft position in the bearing in the presence of a faulted power bus and/or control axis.

Active magnetic bearings are attracting considerable attention as a means of improving efficiency of rotating machinery, reducing or eliminating complexity of existing bearing lubrication systems, achieving high rotational speeds and gaining active control of vibrations in complex rotating masses. Recent advances in both power electronics and control microprocessors have made such active magnetic bearing systems feasible. However, for active magnetic bearings to be successfully applied to high reliability applications such as aircraft engine rotor support and vibration control, bearing and control structures which provide reliability and fault tolerance are required.

In most systems requiring high reliability, it is conventional to use brute force redundancy schemes. Such schemes have several disadvantages. For example, each multi-phase electric machine in such systems is generally tightly coupled electromagnetically from phase to phase, preventing it from functioning as a fault tolerant component by itself via phase redundancy. Since each individual machine lacks fault tolerance, multiple independent machines must be combined to provide the required system redundancy, resulting in added weight, volume and potential failure points. Another disadvantage is that each multi-phase power electronic drive/controller is tightly coupled electrically from phase to phase, preventing it from functioning as a fault tolerant component by itself via phase redundancy. Since each individual drive/controller lacks fault tolerance, multiple independent drives/controllers must be combined to provide the required system redundancy resulting again in added weight, volume and potential failure points. Still another disadvantage is that the multiple independent machines and drives/controllers are interconnected electrically by a common bus and/or mechanically by a common shaft so that the failure of one provides paths for the fault to propagate to other parts of the system. Such fault propagation negates the power system redundancy, resulting in loss of power to the load. Thus, overall reliability of the electric power system depends critically on the failure rates of the electric machines.

While alternating current (AC) machines are not inherently fault tolerant, a switched reluctance (SR) machine can be used as both a motor and a generator and does have inherent fault tolerant capabilities. A basic three-phase SR machine uses iron laminations with salient stator poles and rotor poles. The number of stator poles is greater than the number of rotor poles. For example, one form of machine may have twelve salient stator poles and eight rotor poles. The stator windings fit around the stator poles and are arranged in pairs or phases so that the rotor poles are attracted towards alignment with the stator poles when the stator poles are excited. This operation allows for either positive or negative torque reduction, depending on whether the rotor is approaching or leaving alignment with a stator pole. The inherent simplicity of the basic SR machine makes it desirable for aerospace applications. The rotor comprises a stack of iron laminations with no spinning magnets or windings, making the machine usable at high speed. Further, since the SR machine has no magnets, it can be designed to operate at high temperatures limited by the temperature ranges of available wire insulation systems. Another feature which makes an SR machine attractive for aerospace applications is its inherent fault tolerance. The SR stator phases are to a high degree electromagnetically independent of each other. This fact, combined with the absence of spinning rotor magnets, allows the SR machine to sustain a serious fault in any stator winding without disrupting torque production in the other unfaulted phases. These fault tolerant properties extend to the drive power electronics in that the SR machine stator windings are excited as separate phase legs rather than being interconnected in wye or delta configurations as in conventional AC drives.

As a result of the phase independence in an SR machine, the available average torque output from an N-phase SR machine, following loss of a phase, is simply $(N-1)/N$ of its prefault value (excluding compensating actions). Thus, increasing the number of phases reduces the post-fault output degradation. For example, post-fault torque production is 67 percent for a single phase failure in a three-phase machine and 75 percent for a single phase failure in a four-phase machine. In addition, the average torque lost in the faulted phase can be replaced by designing the SR machine and its control electronics to permit elevated excitation of the remaining unfaulted phases. Therefore, the basic SR machine, due to the inherent electrical and magnetic phase independence, can continue to function in the presence of power electronic and electrical machine faults. An SR motor drive, once started, can continue to operate with as little as one phase powered.

SUMMARY OF THE INVENTION

An object of the present invention is to provide a fault tolerant system for an active magnetic bearing, including a redundant electrical power system coupled to a switched reluctance generator such that the system is capable of supplying a multi-phase active magnetic bearing with power sufficient to maintain operation even in the presence of faulted phases or phase power supplies.

In an illustrated embodiment, the invention employs a power distribution system coupling a switched reluctance generator to a multiple axis fault tolerant radial magnetic bearing. In an illustrative form, the bearing has three radial control axes which are made up of twelve electromagnetic stator poles organized into six electromagnets or force-producing pole pairs with 60° radial spacing. Two pole pairs at 180° radial separation combine to generate a single control axis. The stator core is segmented with nonmagnetic sections in order to minimize magnetic coupling between adjacent pole pairs. This segmentation prevents interference between pole pairs under fault conditions. Only two of the three control axes are required to maintain stable rotor suspension, with the third redundant axis providing fault tolerance. The bearing electric system, including the controls for the electric system, the power supplies and the power electronic pole drives, are also independently operated from separate power sources to provide the additional fault tolerance for the electric power system. In particular, the system is illustrated in an aircraft engine electric system employing active magnetic bearings for rotor suspension. The system employs three independent direct current (DC) electrical distribution buses powered by an integral fault tolerant/redundant switched reluctance generator. The three independent DC buses feed power to radial magnetic bearing structures having three control axes, one for each independent source of power. The active magnetic bearings are configured such that each of the control axes is physically isolated and powered by a different DC power bus, respectively, such that failure of any given DC transmission bus results in a loss of force for that control axis only. The active magnetic bearing will still be capable of controlling rotor shaft position using only the remaining powered control axis.

In one form, the electric power distribution system of three independent DC power buses includes power controls operatively connected in circuit with each of the power buses and the bearing and arranged so that at least three independent axis control systems are coupled to a respective one of the bearing control axes for controlling power from a corresponding one of the power buses. Three supervisory controllers are connected to each of the axis control systems for establishing rotor dynamic control by position commands to the axis control systems and providing redundant control of each axis control system.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawing(s) in which:

FIG. 1b graphically represents orthogonal control axes for the bearing of FIG. 1a;

DETAILED DESCRIPTION OF THE INVENTION

Figure 1A:
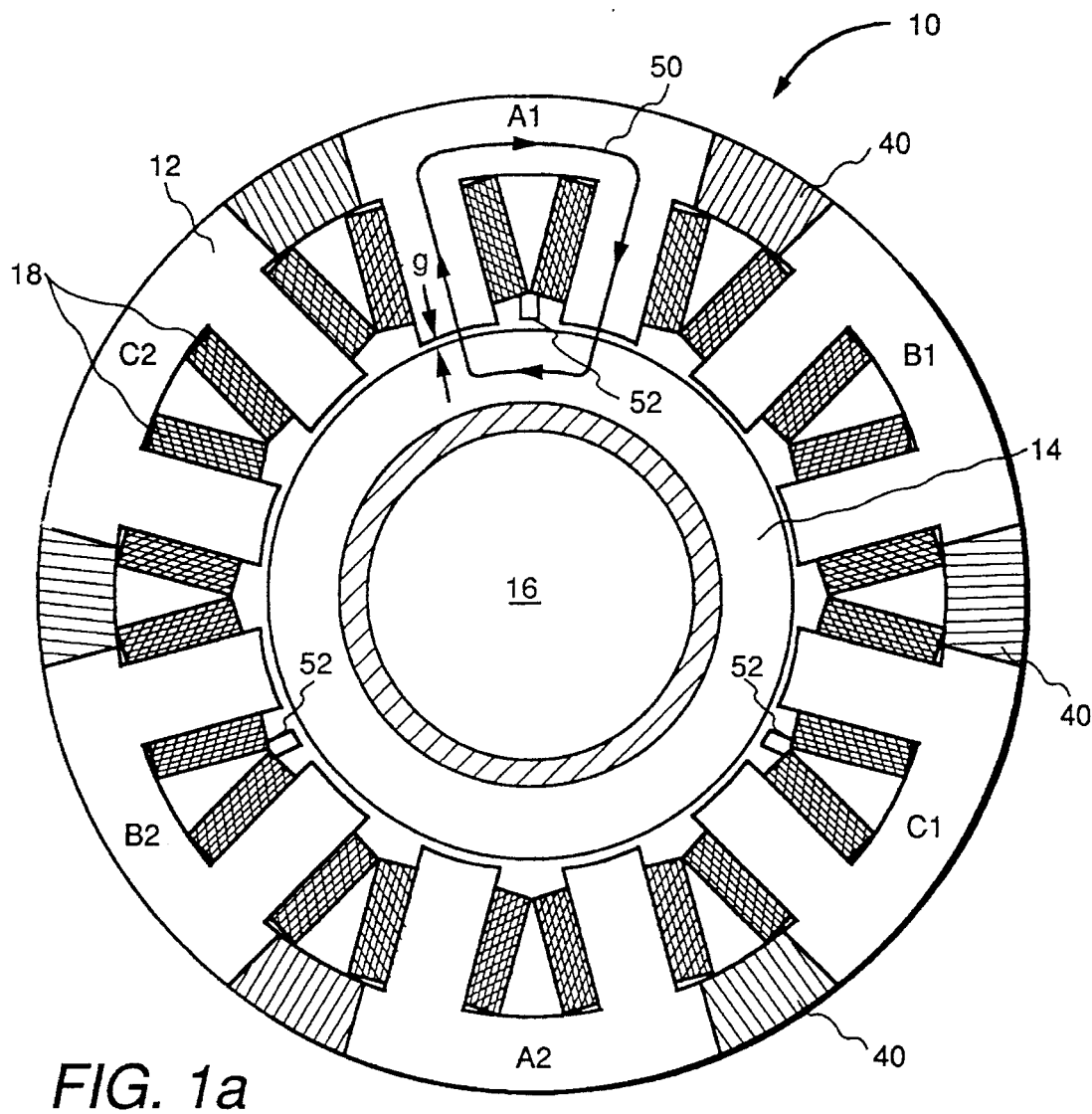
FIG. 1a is a simplified cross-sectional view of a typical fault tolerant radial magnetic bearing.

FIG. 1a illustrates a fault tolerant active radial magnetic bearing 10, such as described in commonly assigned U.S. patent application Ser. No. 07/970,197, filed Nov. 2, 1992, by J. P. Lyons, M. A. Preston and G. B. Kliman, the disclosure of which is hereby incorporated by reference.

Figure 1B:
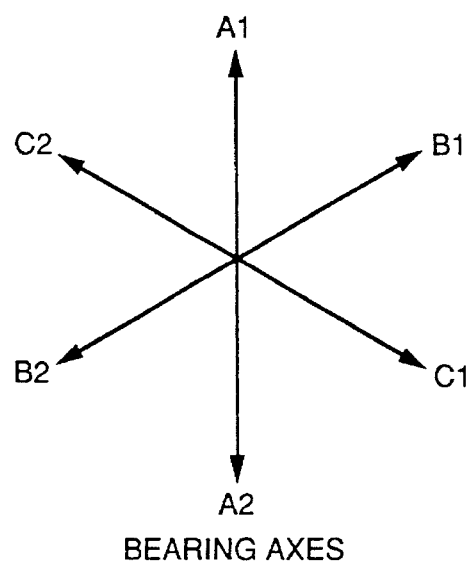

Magnetic bearing 10 includes a stator 12 and a rotor 14 mounted for rotation within stator 12 and coupled to a shaft 16. Stator 12 includes a plurality of stator poles each having a winding 18 wound thereon in well-known manner. Pairs of diametrically opposite stator poles each define a respective radial control axis. By way of illustration, magnetic bearing 10 of FIG. 1a has three radial control axes, as indicated in FIG. 1b. In particular, stator 12 has twelve electromagnetic stator poles configured as six force-producing electromagnets or pole pairs A1, B1, C1, A2, B2, and C2, with a 60° radial spacing between pole pairs. Two electromagnets or pole pairs at 180° radial separation function jointly to generate a respective one of the control axes.

Stator 12 is segmented circumferentially by situating an axially extending nonmagnetic stator flux barrier 40, such as Inconel or other weldable nonmagnetic alloy, between adjacent pole pairs. The stator flux barriers 40 provide magnetic isolation for each pole pair and thus allow functioning force-actuating pole pairs to continue operating even in such close proximity to faulted magnetic poles. Advantageously, any two of the three (or more) control axes are sufficient to maintain rotor suspension in the bearing system. Hence, bearing operation continues even in the presence of faults, such as, for example, faulted magnetic poles, power electronic shorts, and phase power loss. Even greater fault tolerance may be achieved using more than three control axes.

In operation, the magnetic flux produced by the forcing current or magnetomotive force (mmf) in each pole winding 18 circulates through the stator poles of each respective pole pair and through the rotor and stator cores, crossing two air gap lengths g. An exemplary magnetic flux path 50 for pole pair A1 is illustrated in FIG. 1a.

The position of rotor 14 within stator 12 is controlled by energization of the electromagnetic stator poles. Such energization "pulls" the rotor toward an energized pole pair. It is possible to energize the stator pole pairs in pairs, i.e., concurrently energize pole pairs A1 and A2, for example. The net effect of such concurrent energization is to pull the rotor in two opposing directions in an attempt to center the rotor about its geometric axis. This approach is generally inefficient and results in undesirable heating of the rotor due to the additional flux passing through the rotor. A preferred method is to energize only one pole pair at any time. In practice, the pole pairs are energized at high rates, for example, at ten kilohertz, so that instantaneous position movements of the rotor are minute.

In order to determine the actual position of rotor 14, bearing 10 may incorporate conventional eddy current sensors 52, such as a Bentley-Nevada Corp. sensor, to provide data representative of the actual position of rotor 14 in stator 12. A preferred method of determining rotor position, i.e., air gap between rotor and stator, is to compute position from measured current and voltage at electromagnetic pole windings 18. A method for obtaining position data in this manner is set forth in commonly assigned U.S. patent application Ser. No. 07/970,194 filed Nov. 2, 1992 by J. P. Lyons and M. A. Preston, the disclosure of which is hereby incorporated by reference.

The three-axis magnetic bearing 10 of FIG. 1a is desirable for minimizing or inhibiting bearing failure if one axis is inoperative. In order to prevent bearing failure under a loss of electrical power, it is desirable to provide independent and isolated electric power to each control axis of bearing 10.

Figure 2:
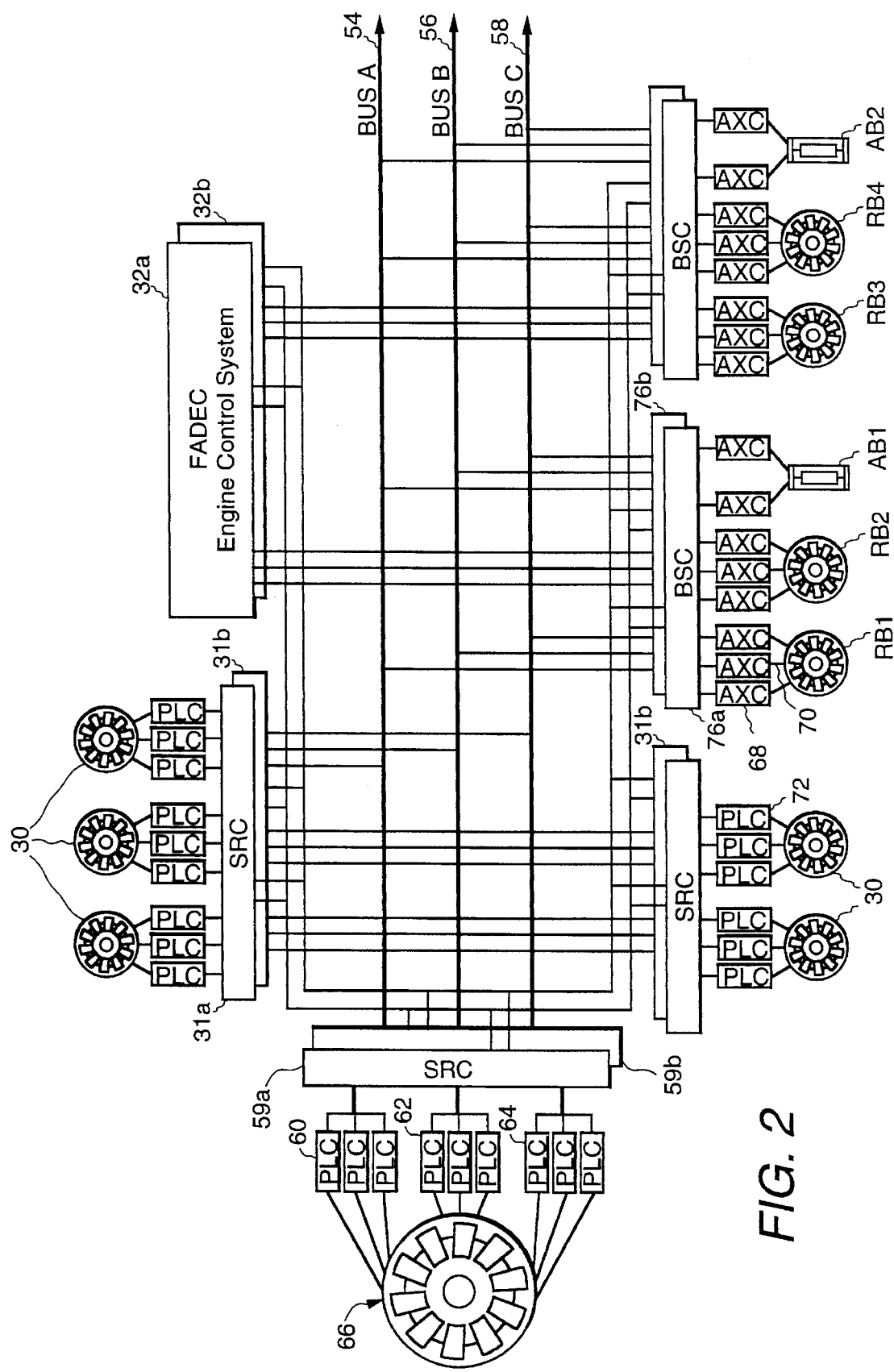
FIG. 2 is a schematic representation of a fault tolerant power system in accordance with the present invention.

In accordance with the present invention, a plurality of magnetic bearings 10 are shown in FIG. 2 in a system having three independent direct current (DC) power buses 54, 56 and 58, such as might be employed on commercial aircraft. Each bus 54, 56, 58 is supplied from a respective phase leg controller (PLC) for a switched reluctance machine, such as converter 60, 62 and 64 connected to corresponding phase windings of switched reluctance machine 66 which may be of the type shown and described in commonly assigned T.

M. Jahns U.S. Pat. No. 4,896,088, issued Jan. 23, 1990 and hereby incorporated by reference. Converters 60, 62 and 64 may be conventional AC-to-DC converters using controlled rectifiers, such as insulated gate bipolar transistors (IGBT) or MOS (metal-oxide-semiconductor) controlled thyristors, to establish a regulated DC voltage, e.g., 270 volts DC, on each bus 54, 56 and 58. A redundant switched reluctance controller (SRC) 59a,59b controls each converter 60,62 and 64 to regulate voltage on the DC buses in a well-known manner and further to enable generator 66 to function as a starter motor during starting of an aircraft engine. Each bus 54, 56, 58 provides power to a respective axis control means (AXC) 68, 70 and 72 at each bearing 10. Also shown in FIG. 2 are switched reluctance motors 30 for driving accessories such as fuel pumps, lube pumps, fuel nozzle actuators, etc., each of motors 30 being controlled from redundant switched reluctance controllers 31a and 31b through individual phase leg controllers, one for each motor phase leg. Redundant bearing system controllers (BSC) 76a and 76b control a pair of radial bearings RB1 and RB2 and an axial bearing AB1 for one engine spool through independent axis controllers such as axis controllers 68, 70 and 72, one for each bearing phase leg. Each of bearings RB1, RB2 and AB1 is constructed in accordance with bearing 10 shown in FIG. 1a. A second set of radial bearings RB3 and RB4 and axial bearing AB2, are also shown for use with a second engine spool. FIG. 2 also illustrates a redundant engine control system 32a,32b, each of which comprises a full authority digital electronic control (FADEC) system.

Figure 3:
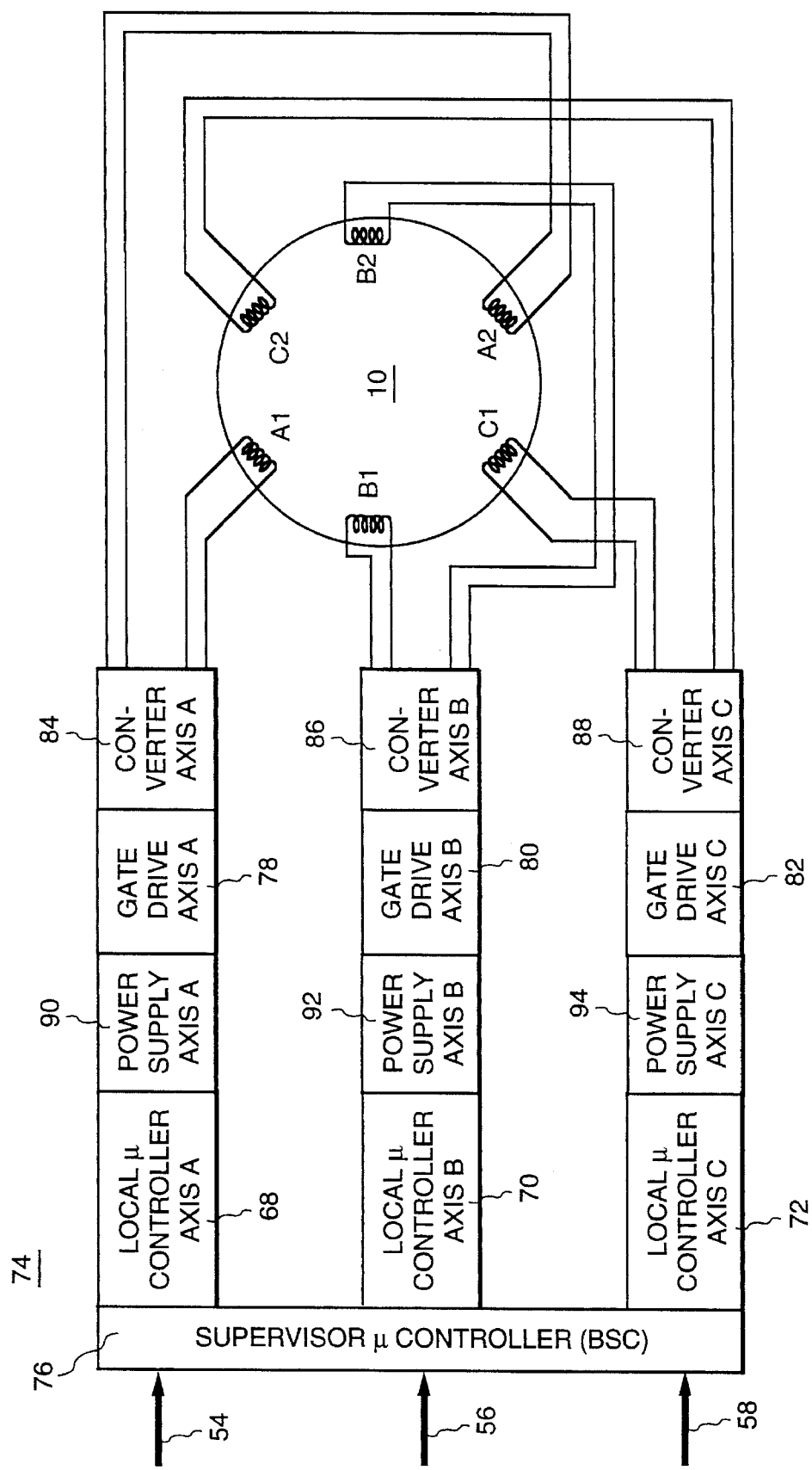
FIG. 3 is a block diagram of one implementation of a fault tolerant controller for a multi-axis magnetic bearing.

FIG. 3 shows a control system 74 for a three-axis magnetic bearing 10 in which each axis is controlled by an independent axis controller 68, 70, 72 and each axis controller being supplied with power from one of the independent DC buses 54, 56, 58, respectively, illustrated in FIG. 2. A supervisory or bearing system controller (BSC) 76 is coupled to each of the three axis controllers and provides instructions to each axis controller for positioning rotor 14 with respect to stator 12 in magnetic bearing 10 (FIG. 1a). Each axis controller 68,70,72 either receives feedback signals from eddy current sensors 52 (shown in FIG. 2) positioned in magnetic bearing 10 and giving the exact position of rotor 14 within stator 12, or computes rotor position in the manner described in the aforementioned U.S. patent application Ser. No. 07/970,194. Each axis controller utilizes the shaft position to determine air gap G between stator 12 and rotor 14 (FIG. 1a) in order to calculate the amount of flux required to be induced in each stator pole to produce the magnetic force specified by bearing system controller 76. The rotor position is also supplied to bearing system controller 76 where it is utilized to calculate a desired position or air gap G for the rotor and to provide that information to each of local axis controllers 68, 70 and 72. Each local axis controller 68,70,72 uses a computed model of bearing 10 to calculate the amount of flux to be generated in each axis in order to produce the magnitude of magnetic force commanded by the bearing system controller. In the illustrated system, each local axis controller 68,70,72 provides signals to a respective gate drive circuit 78, 80 and 82 (not shown in FIG. 2) which activates switching devices (not shown) within corresponding power converters 84,86 and 88, respectively, to apply power to respective electromagnetic windings A1 and A2, B1 and B2, C1 and C2 of bearing 10. In a preferred embodiment, the system positions the rotor along a particular axis, e.g., A1–A2, by actuating one of the pole pairs (e.g. , pole pair A1) rather than simultaneously actuating both pole pairs A1, A2. For example, in order to position the shaft along the axis extending from pole pair A1 to pole pair A2, pole pair A1 would be energized in order to move the shaft towards that pole pair and no power would be applied to pole pair A2. Respective power supplies 90, 92 and 94 for each axis provide the logic control power for both the respective local axis controller 68, 70 and 72 and the respective gate drive circuits 78, 80 and 82 from the associated respective DC bus 54,56,58. (For simplicity of illustration, the power supplies and gate drive circuits are not shown in FIG. 2.)

Figure 4:
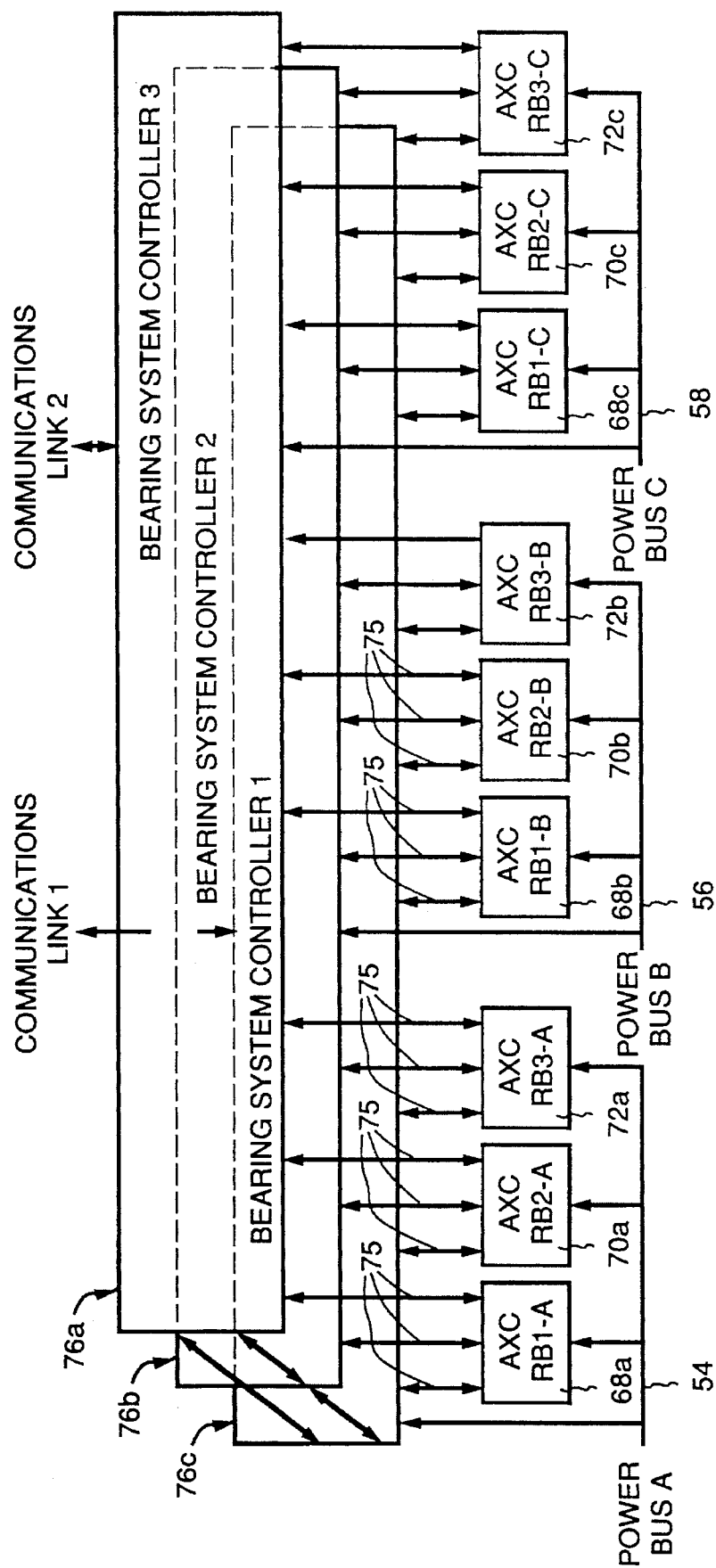
FIG. 4 is a block diagram of a portion of another form of fault tolerant controller for a multi-axis magnetic bearing.

FIG. 4 illustrates one embodiment of the present invention as applied to an aircraft gas turbine engine, and in particular to a single engine spool having multiple active magnetic bearings 10 (see FIG. 2) such as radial bearings RB1, RB2 and RB3 for supporting a rotating designated shaft (not shown). Each bearing RB1, RB2, RB3 is assumed to have three control axes designated, in the case of bearing RB1, as RB1-A, RB1-B and RB1-C. The illustrative embodiment incorporates three redundant supervisory or bearing system controllers 76a, 76b and 76c, each having a data communication link to each local or axis controller 68A–68C, 70A–70C and 72A–72C. The data communication links 75 between bearing system controllers 76a,76b, 76c and the respective axis controllers 68, 70 and 72 are preferably high speed serial data links. Bearing system controllers 76a, 76b and 76c calculate the amount of force to be produced by each axis controller 68, 70 and 72 and the axis controllers then calculate the volt-seconds of power for energizing each pole pair during each update cycle of the axis controller in order to generate the commanded force. One form of axis controller is illustrated in the aforementioned co-pending application Ser. No. 07/970,194 filed Nov. 2, 1992. The primary difference between the system of FIG. 3 and that of FIG. 4 is in the use of redundant supervisory or bearing system controllers 76b and 76c. Various methods are available for determining which system controller 76a,76b,76c is to provide control input signals to axis controllers 68, 70 and 72. For example, controller 76a may be the primary controller and include a self-test routine running at regular intervals to detect failure. In the event a failure is detected, the system switches automatically to controller 76b. If controller 76b fails, the system switches automatically to controller 76c. In another control format, each of the supervisory controllers 76a, 76b and 76c calculates the information to be supplied to each axis controller (AXC) 68, 70 and 72 and compares that information with information from the other two supervisory controllers. If two of the supervisory controllers agree and one disagrees, the information from the two agreeing controllers is utilized to control bearing rotor position. This type of system is commonly referred to as a redundant voting system and is used in critical applications such as by NASA in the space shuttle program. Other types of redundant systems for the supervisory controller may also be used. An exemplary fault tolerant multiprocessor controller for magnetic bearings is described in an article appearing in the August 1988 issue of IEEE Micro at pages 6–19, entitled "A Fault Tolerant Multiprocessor Controller for Magnetic Bearings" by Messrs. Yates and Williams of the University of Virginia, and which is hereby incorporated by reference. The article also mentions other fault tolerant multiprocessing controller systems such as the system, developed by Stanford Research Institute for NASA.

Figure 5:
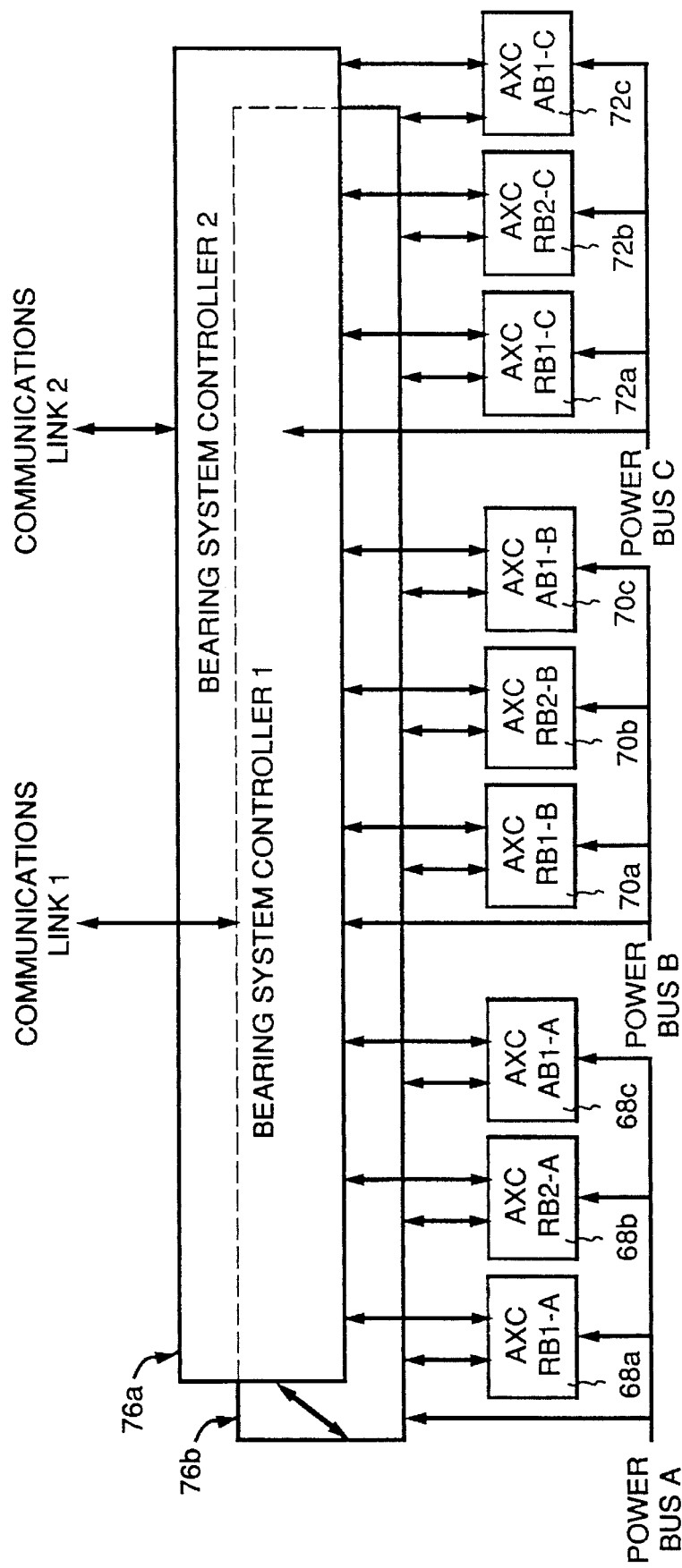
FIG. 5 is a block diagram of a portion of an alternative form of the fault tolerant controller of FIG. 4.

Still another form of the invention is shown in FIG. 5 in which the triple redundant supervisory controllers 76a, 76b, 76c of the system shown in FIG. 4 have been reduced to duplex redundancy using only two supervisory controllers 76a, 76b. While triple redundancy of controllers 76 provides a higher degree of fault tolerance, testing of the system of FIG. 5 has shown insignificant detriment when compared to the cost savings attributable to elimination of one controller. Various monitoring systems are known for determining operability of a controller, including comparing the controller output signals and, in the event of a difference, comparing those output signals against expected standards and disabling the controller with the largest error.

While the invention has been described in what is presently considered to be a preferred embodiment, many variations and modifications will become apparent to those skilled in the art. Accordingly, it is intended that the invention not be limited to the specific illustrative embodiment but be interpreted within the full spirit and scope of the appended claims.

What is claimed is:

1. A fault tolerant active magnetic bearing system comprising:

a magnetic bearing having a rotor mounted for rotation within a stator and for coupling to a shaft, said stator having at least six adjacent electromagnets configured such that each electromagnet is situated opposite from a corresponding electromagnet, adjacent electromagnets being separated by nonmagnetic flux barriers, each pair of diametrically opposite electromagnets being adapted to jointly generate a magnetically isolated control axis such that there are at least three control axes, only two of said control axes being required to maintain operation of said magnetic bearing;

an electric power distribution system having at least three independent power buses, each of said power buses being coupled to a respective pair of said diametrically opposite electromagnets for supplying power thereto;

power control means operatively coupled in circuit with said power buses and said bearing for controlling power to each said respective pair of said diametrically opposite electromagnets; and a plurality of bearing system controllers each coupled to a separate respective one of said power control means, each of said bearing system controllers being communication linked with each other for coordinating operation of the separate respective ones of said axis control means.

2. The bearing system of claim 1 and including position sensing means operatively associated with said rotor for monitoring instantaneous position of said rotor with respect to said stator and providing rotor position data to said power control means and said bearing system controller.

3. The bearing system of claim 2 wherein said power control means includes means responsive to said rotor position data for computing power to be applied to said electromagnets for positioning said rotor.

4. The bearing system of claim 3 wherein said bearing system controller includes means responsive to said rotor position data for commanding energization of selected ones of said electromagnets through respective ones of said power control means.

5. The bearing system of claim 4 wherein each of said power control means includes a converter for supplying unidirectional current to a respective pair of said electromagnets for a respective predetermined time duration.

6. The bearing system of claim 5 wherein said each of said power control means comprises means for independently energizing each electromagnet of said respective pair of electromagnets during said respective predetermined time duration.

7. The bearing system of claim 1 wherein said plurality of bearing system controllers is grouped into at least two supervisory controllers, each of said supervisory controllers being coupled to said power control means for establishing rotor dynamic control by supplying force commands to said power control means, thereby providing redundant control for each of said power control means.

8. The fault tolerant active magnetic bearing system of claim 7 and including means coupled to said power control means for independently controlling power to each electromagnet of each control axis.

* * * * *